Sept. 3, 1935.  H. W. PLEISTER  2,013,503
SPRING TOGGLE BOLT
Filed Dec. 26, 1934  3 Sheets-Sheet 1
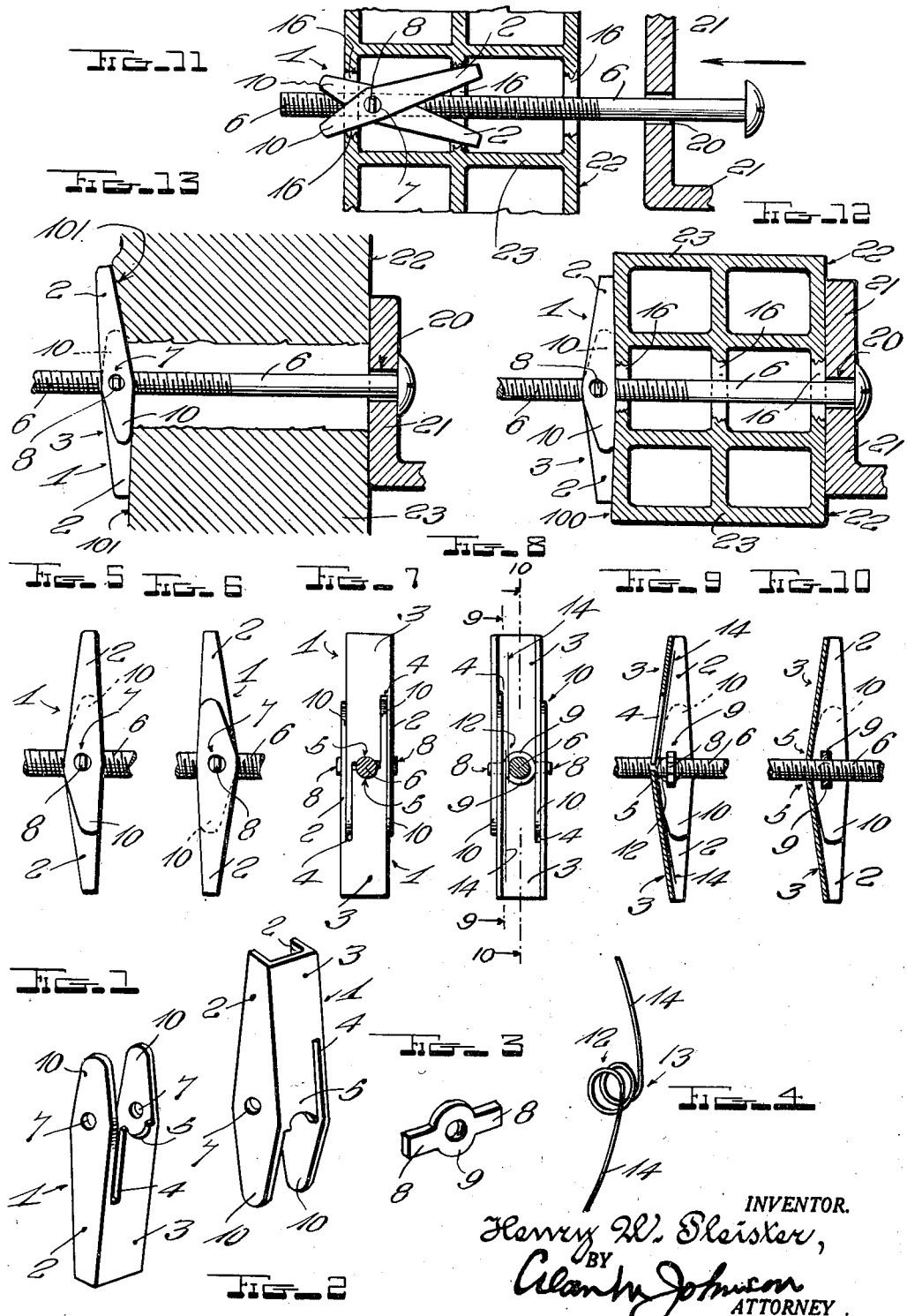
INVENTOR.
Henry W. Pleister,
BY
Alan W. Johnson
ATTORNEY.

Sept. 3, 1935.  H. W. PLEISTER  2,013,503
SPRING TOGGLE BOLT
Filed Dec. 26, 1934  3 Sheets-Sheet 2
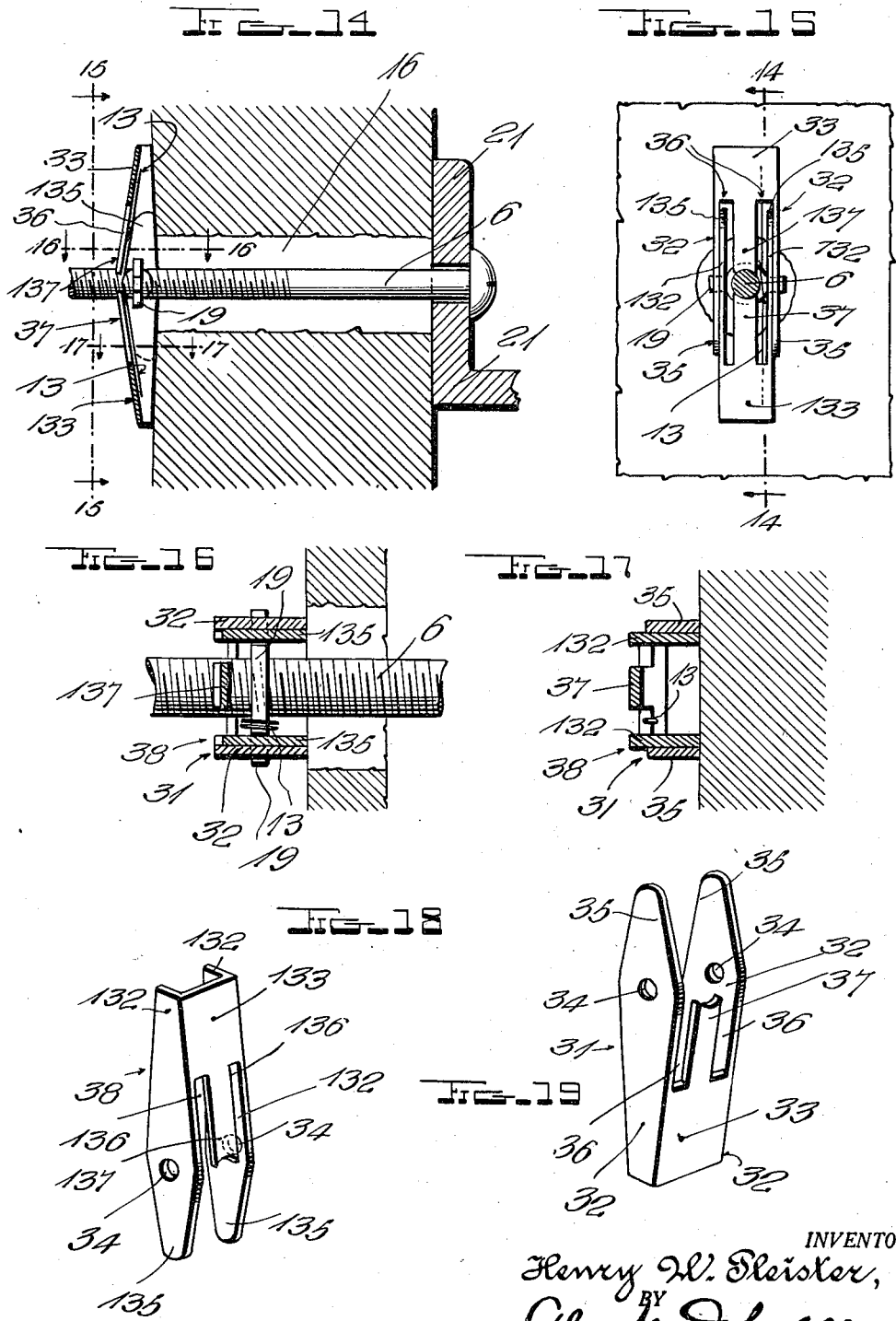
INVENTOR.
Henry W. Pleister,
BY
Alan M Johnson
ATTORNEY.

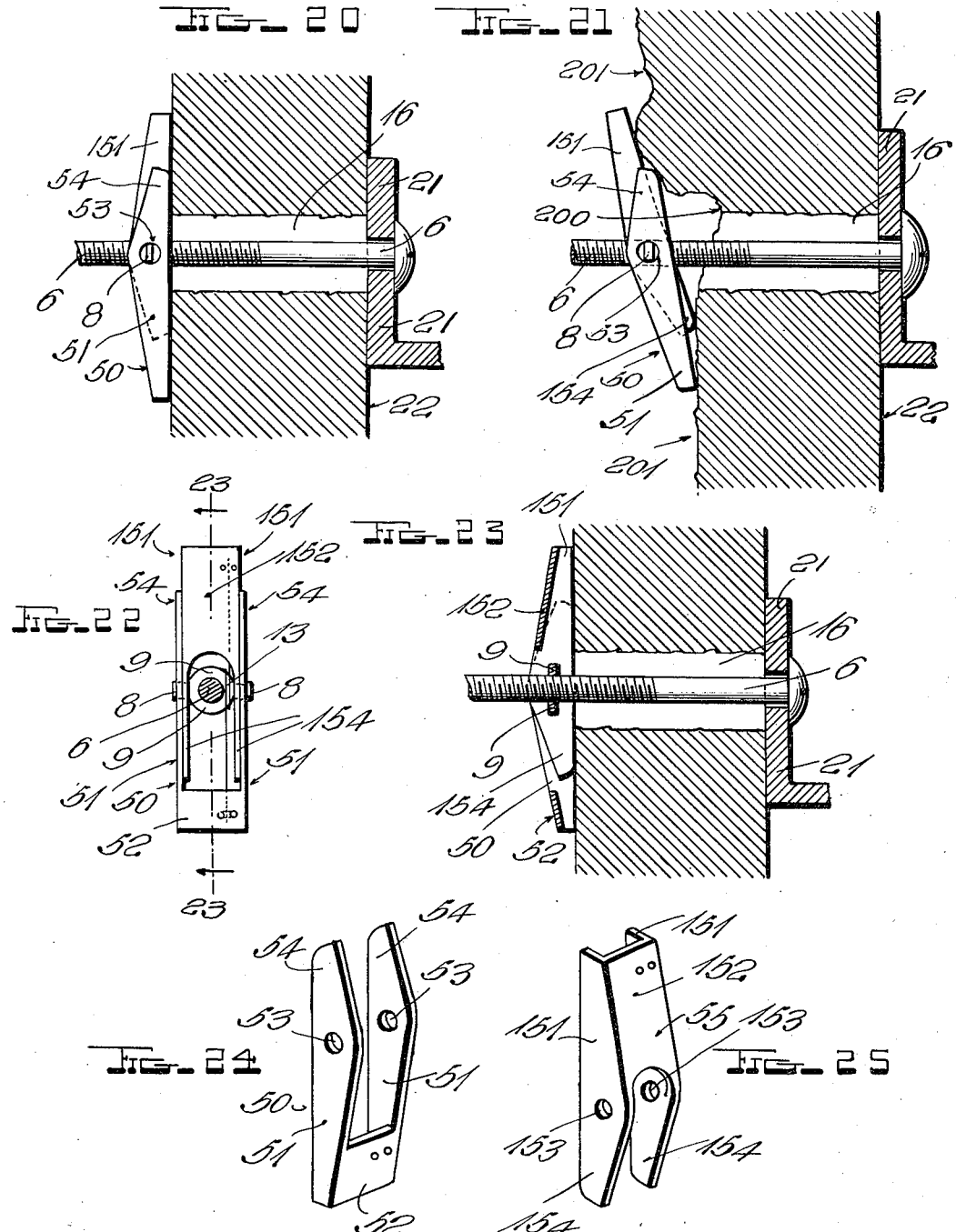

Patented Sept. 3, 1935

2,013,503

UNITED STATES PATENT OFFICE 2,013,503

SPRING TOGGLE BOLT

Henry W. Pleister, Westfield, N. J.

Application December 26, 1934, Serial No. 759,288

15 Claims. (Cl. 85—3)

My invention relates to a new and improved spring toggle bolt, to secure objects to walls, ceilings, or other supports, where it is impossible, or not feasible, to get behind the support to manually apply a nut, or other fastening member, to the bolt supporting the work.

My invention further comprises a spring toggle bolt, having two pivoted wing anchors, each wing anchor having arms extending on either side of the pivot, and preferably of unequal length, the shorter arm, being long enough, together with the long arm, to straddle or bridge the rim of the hole in the support so that each wing anchor normally bears on either side of the hole, and normally has at least two points of contact on the interior or concealed surface of the wall or other support. By using two similar pivoted wing anchors, my spring toggle bolt insures that normally there will be at least four points of contact with the inner surface of the wall or other support; thereby distributing the strain and stresses of the load, and forming a firm bond or grip with the interior of the wall.

My invention further comprises such a toggle bolt in which each wing arm is provided with stops to contact directly with a cooperating stove or other bolt, to limit the pivoting movement of the wing anchors; though in one form of my invention no stops are employed, as will be hereinafter described.

My invention further comprises, in its preferred form, a spring toggle bolt, having duplicate wing anchors, which avoids rights and lefts, saves time in assembling, and expense in manufacturing, in that only one set of dies is necessary to strike up both wing anchors.

My invention further relates to certain combinations, sub-combinations, and articles of manufacture as will be more fully hereinafter described and pointed out in the claims.

In the accompanying drawings I have shown different illustrative embodiments of my invention, simply by way of example, though it is to be distinctly understood that my invention is not to be confined to these particular forms. In these drawings the same reference numerals refer to similar parts in the several figures.

Figs. 1 to 13 inclusive illustrate my preferred form. Fig. 1 is a perspective view of one of my wing anchors.

Fig. 2 is a perspective view of an identical wing anchor reversed from the position shown in Fig. 1.

Fig. 3 is a perspective view of a trunnion nut.

Fig. 4 is a perspective view of a coil spring, employed to spread the wing anchor.

Fig. 5 is a front side elevation of two (2) of the identical wing anchors assembled on the trunnion nut, and shown in connection with a cooperating stove or other bolt, which is broken away.

Fig. 6 is a rear side elevation.

Fig. 7 is a rear elevation, with the wing anchors in their operative position, the bolt being shown in section.

Fig. 8 is a front elevation illustrating the inside of the wing anchors, the bolt being shown in sections.

Fig. 9 is a vertical section on line 9—9 of Fig. 8.

Fig. 10 is a vertical section on line 10—10 of Fig. 8.

Fig. 11 is a vertical section illustrating my toggle bolt, being inserted through a hole, the wing anchors being retracted.

Fig. 12 is a view, similar to Fig. 11, after the spring has caused the wing anchors to fly out into their operative position, and illustrating how the work is supported.

Fig. 13 is a vertical section, similar to Fig. 12, in which the wall of masonry, concrete, brick, plaster, or other material has an irregular inner concealed surface.

Figs. 14 to 19 illustrate a modification. Fig. 14 is a vertical section on line 14—14 of Fig. 15.

Fig. 15 is a rear face view on line 15—15 of Fig. 14, looking in the direction of the arrow.

Fig. 16 is a fragmentary horizontal section on line 16—16 of Fig. 14.

Fig. 17 is a cross section on line 17—17 of Fig. 14.

Fig. 18 is a perspective view of one of the wing anchors of this modification.

Fig. 19 is a perspective view of the other wing anchor of this modification.

Figs. 20 to 25, inclusive, illustrate a second modification, in which no stops to limit the pivoting movement of the wing anchors are employed. Fig. 20 is a vertical section showing my spring toggle engaging with a relatively smooth interior concealed surface.

Fig. 21 is a vertical section, similar to Fig. 20, showing my spring toggle bolt cooperating with a rough, irregular inner surface of a support.

Fig. 22 is a rear elevation.

Fig. 23 is a vertical section on line 23—23 of Fig. 22, showing the spring toggle bolt mounted in a wall of concrete or similar material.

Fig. 24 is a perspective view of one of the cooperating wing anchors.

Fig. 25 is a perspective view of the other cooperating wing anchor.

In the preferred form of my invention, that illustrated in Figs. 1 to 11 inclusive, I employ dies to strike up from sheet metal the wing anchor 1, Fig. 1. This wing anchor has two (2) side arms 2, 2 of equal length, a connecting back member 3, provided with a slot 4 and with a stop 5, preferably curved to cooperate with the stove or other bolt 6. The side arms 2, 2 are also provided with pivoting means, in the form of pivoting holes 7, 7, to be mounted on the trunnions 8, 8 of the trunnion nut 9, Fig. 3.

The arms 2, 2 are extended past the pivoting hole 7, 7 to form secondary and, preferably, shorter arms 10, 10. Each wing anchor is channel-shaped in cross section.

By employing identical wing anchors 1, 1 there are no rights and lefts; only one set of dies has to be used, and the time of assembling is materially reduced, because any two anchors will form a toggle head.

It is only necessary to reverse the position of the second wing anchor 1 from that of the other wing anchor 1, as shown in Figs. 1 and 2, and assemble them on the trunnions 8, 8 of the trunnion nut 9, first placing the coil 12 of the coil spring 13 on one of the trunnions 8, so that one of its arms 14, will lie in the channel of each wing anchor, ready to be put under tension when the wing anchors are compressed towards the bolt 6, Fig. 11, to insert the spring toggle bolt into the hole 16 in the wall.

In assembling two of the wing anchors to form one spring toggle bolt one of the arms 10, for example the one on the right of Fig. 1, cooperates with a slot 4 of the wing anchor, illustrated in Fig. 2, while the arm 10 on the left of Fig. 2, is received within and cooperates with the slot 4 of the wing anchor of Fig. 1. This leaves one arm 10 of each wing anchor on the outside of the completed spring toggle bolt, see Figs. 7 and 8.

While the secondary arms 10, 10 of each wing anchor are shorter than the longer arms 2, 2, they are of sufficient length to overlap or bridge the interior of the hole 16 in the wall or other support. That is, each wing anchor 1 with its long arms 2, 2 and its short secondary arms 10, 10, straddle or bridge the interior end of the hole 16, see Figs. 12 and 13.

In use the stove or other bolt 6 is passed through a hole 20 in the work 21, to be supported on the face or surface 22 of the wall, partition, or other support 23, and then screwed into the trunnion nut 9. The wing anchors 1, 1 are then retracted, usually by the thumb and forefinger of the mechanic, which places the spring 13, under tension, see Fig. 11. As soon as the ends of the wing anchor pass the end of the hole 16, the tension on the spring 13 is released, and this causes the wing anchors 1, 1 to fly out at right angles to the bolt 6. In this form of my invention, this pivoting swing action is limited by the stops 5, 5 contacting on either side of the bolt 6.

By then screwing up on the bolt 6 the work 21 is securely held to the face 22 of the wall or other support 23. It will also be noted that the bolt 6 can be adjusted in and out of the trunnion nut 9 to permit it to firmly grip variable thicknesses of work 21. Any excess length of the bolt 6, which may not be necessary to hold the work, will be concealed on the interior of the wall 23, and will not have to be cut off, or otherwise removed, and will not detract from the appearance of the job.

In my spring toggle bolt, there will be normally at least four (4) points of contact with the inner or concealed surface of the wall, two at the ends of the long arms 2, 2, and two at the ends of the short arms 10, 10, which bridge the hole 16, thus dividing and distributing the strain and stresses on the inside surface of the wall. While it is possible in a freak irregular surface on the inside of the wall, or other support, that one of the wing anchors may not contact with the inner surface, or may not initially contact with said inner surface, such freak irregular formation would, in actual practice, be so rare as to be practically negligible. Even in such freak irregular formations, when the toggle bolt was tightened up it would, it is believed in most cases, cause the metal of one wing anchor to bite into the freak irregular interior surface, if it is sufficiently soft, or if not the metal of that wing anchor would probably give or yield slightly to allow the other wing anchor to function.

In Fig. 12 I have illustrated my spring toggle bolt, cooperating with a more or less smooth inner surface 100 of the wall.

My spring toggle bolt, however, is equally adapted to bind or grip on a rough or irregular inner surface 101, Fig. 13.

In drilling a hole through a wall of tile, plaster, concrete, masonry, or other material, it is often found that the interior of the wall is rough or irregular. Frequently at or adjacent the very end of the hole, a portion of the wall may spall off, leaving a jagged and irregular bearing.

In Fig. 13, I have shown how my spring toggle bolt automatically adjusts itself to an irregular or rough surface 101. Whether the interior surface is rough and irregular, such as 101, or whether a portion of the wall has been spalled off, by the drill forming the hole, the wing anchors in this form of my invention, as well as in the other forms to be hereinafter described, will all straddle or bridge the hole, forming at least four points of contact with the inner surface of the wall or other support. When the inner surface of the wall is relatively smooth, as in Fig. 12, the wing anchors will lie flat against the surface and have an enlarged bearing area.

In Figs. 14 to 19 I have shown a modification of my invention.

In this form my wing anchors are not duplicates, in that 31, Fig. 19, is a little larger than 38, Fig. 18, which latter fits within the wing anchor 31.

The wing anchor 31, Fig. 19, is provided with relatively long side arms 32, 32, and a connecting back member 33. Each side arm 32 is extended beyond the pivot holes 34, 34 to form secondary and shorter arms 35, 35. The back 33 is provided with two slots, 36, 36, forming a stop 37, which is preferably formed concave to more readily cooperate with the stove or other bolt 6, to limit the swing of the pivoted wing anchor 31.

The cooperating wing anchor 38, Fig. 18, is a duplicate of that shown in Fig. 19, except that it is a trifle smaller. It has side arms 132, 132, secondary arms 135, 135, slots 136, and a stop 137, similar in all respects to the wing anchor illustrated in Fig. 19.

In assembling the spring toggle bolt, the wing anchor 38 fits within the wing anchor 31, its secondary arms 135, 135, fitting into the slots 36, 36 of the wing anchor 31, and the arms 32, 32 and 35, 35 over-laying or extending outside of the cooperating arms of the other wing anchor. See Figs. 15, 16 and 17.

In this modification, a trunnion nut 19 and spring 13 are employed the same as in the preferred form.

The manner of straddling or bridging the inner end of the hole 16, automatic adjustment of the wing anchors on an irregular inner surface, adjusting the screw to hold different thicknesses of work, and limiting the pivoting movement of the wing anchor by the stops 37 and 137 engaging directly with opposite sides of the stove or other bolt 6, are all the same as in the preferred form previously described.

In Figs. 20 to 25 I have illustrated another modification.

In this form no stops, such as 5, 5 in Figs. 1 to 13, or stops such as 37 and 137 in Figs. 14 to 19 inclusive are employed.

In this form the tension of the spring 13 is not arrested or stopped by the wing anchors engaging with the bolt, or otherwise.

The wing anchor 50, Fig. 24, is provided with side arms 51, 51, a connecting back 52 and pivot holes 53, 53. Extending beyond the pivot holes are secondary and shorter arms 54, 54, but these shorter arms are long enough, with the arms 51, 51, to bridge or straddle any hole 16 in which the toggle bolt is mounting.

Within the wing anchor 50 is mounted a complementary wing anchor 55, Fig. 25, having long arms 151, 151, short or secondary arms 154, 154, and a back 152, similar in all respects to the wing anchor illustrated in Fig. 24, except it is slightly smaller, and the back 152 extends somewhat further towards the pivot holes 153, 153.

These two complementary wing anchors 50 and 55 are mounted together, the wing anchor 55 being mounted within the wing anchor 50, see Fig. 22.

The manner of applying the spring toggle bolt and adjusting the screw to support the work is the same as in the other forms.

I have illustrated in Fig. 21 a somewhat exaggerated, irregular inner surface of the support. In this figure a portion of the inner surface has been spalled off at 200, and an irregular surface is indicated at 201.

On such an irregular surface as this, the short arms 54, 54 and 154, 154, together with the long arm 51, 51 and 151, 151 will all straddle or bridge the inner end of the hole 16. The wing anchors will automatically adjust themselves as shown in Fig. 21, there being at least four points of contact with the inner surface of the wall; these contacts being at or near the ends of the arms 151, 154 and 51 and 54, so that the work 21 will be held firmly against the face or surface 22 of the wall or other support.

The action herein described applies also to the other forms.

In Fig. 20, the wing anchors are shown cooperating with a smooth interior concealed surface.

Having thus described this invention in connection with illustrative embodiments thereof, to the details of which I do not desire to be limited, what is claimed as new and what is desired to secure by Letters Patent is set forth in the appended claims.

What I claim is:

1. In a spring toggle bolt, the combination of a nut provided with pivoting means to support and pivot a plurality of wing anchors, a plurality of wing anchors pivoted on the nut, each wing anchor being of greater length than the diameter of the hole through which it is to be inserted in a wall or other support, and being pivoted at such a point that each of said wing anchors will bridge or straddle the inner end of the hole, to insure a strong bond or grip, and to distribute the strains and stresses over a relatively large area of the inner surface of the wall or other support.

2. In a spring toggle bolt, the combination of a nut provided with pivoting means to support and pivot a plurality of wing anchors, a plurality of wing anchors pivoted on the nut, each wing anchor being of greater length than the diameter of the hole through which it is to be inserted in a wall or other support, and being pivoted at such a point that each of said wing anchors will bridge or straddle the inner end of the hole, to insure a strong bond or grip, and to distribute the strains and stresses over a relatively large area of the inner surface of the wall or other support, a bolt, resilient means, to rock the wing anchors into their operative position, and means carried by the wing anchors to contact directly with the bolt to limit their movement in one direction.

3. In a spring toggle bolt, the combination of a nut provided with pivoting means to support and pivot two wing anchors, two wing anchors pivoted on the nut, each wing anchor being of greater length than the diameter of the hole through which it is to be inserted in a wall or other support, and being pivoted at such a point that each of said wing anchors will bridge or straddle the inner end of the hole, to insure a strong bond or grip, and to distribute the strains and stresses over a relatively large area of the inner surface of the wall or other support.

4. In a spring toggle bolt, the combination of a nut provided with pivoting means to support and pivot two wing anchors, two wing anchors pivoted on the nut, each wing anchor being of greater length than the diameter of the hole through which it is to be inserted in a wall or other support, and being pivoted at such a point that each of said wing anchors will bridge or straddle the inner end of the hole, to insure a strong bond or grip, and to distribute the strains and stresses over a relatively large area of the inner surface of the wall or other support, a bolt, resilient means to rock the wing anchors and stops carried by the wing anchors, adapted to contact directly with the bolt, to limit their movement in one direction.

5. An article of manufacture for toggle bolts, comprising two wing anchors, having pivoting means, and each having two arms extending on either side of said pivoting means, one of the wing anchors being provided with a slot to cooperate with the arm of the second identical wing anchor, when two wing anchors are assembled to form a toggle head.

6. In a toggle bolt, the combination of two duplicate sheet metal wing anchors, each provided with pivoting means, arms extending on either side of the pivoting means, and each wing anchor being provided with means to receive one of the arms of the other wing anchor, and means to operate the wing anchors.

7. In a toggle bolt, the combination of two duplicate sheet metal wing anchors, each provided with pivoting means, arms extending on either side of the pivoting means, and each wing anchor being provided with means to receive one of the arms of the other wing anchor, a bolt, a nut provided with projections which act as pivot pins and cooperate with the pivoting means of the anchors, which nut also cooperates with the bolt, and resilient means to rock said wing anchors.

8. In a toggle bolt, the combination of two duplicate sheet metal wing anchors, each provided with pivoting means, arms extending on either side of the pivoting means, and each wing anchor being provided with means to receive one of the arms of the other wing anchor, a bolt, a nut provided with projections which act as pivot pins and cooperate with the pivoting means of the anchors, which nut also cooperates with the bolt, and resilient means to rock said wing anchors, and stops carried by the wing anchors, adapted to contact directly with the bolt, to limit the pivoting movement of the wing anchors in one direction.

9. In a toggle bolt, the combination of sheet metal wings or anchors, each provided with pivoting means, and a plurality of slots, and arms extending on either side of the pivots, the arms of one wing anchor being adapted to be received in the slots of the other wing anchor.

10. In a toggle bolt, the combination of sheet metal wings or anchors, each provided with pivoting means, and a plurality of slots, and arms extending on either side of the pivots, the arms of one wing anchor being adapted to be received in the slots of the other wing anchor, a bolt, and a stop on each wing anchor to contact directly with the bolt, to limit their movement in one direction a nut provided with projections which act as pivot pins and cooperate with the pivoting means of the anchors, which nut also cooperates with the bolt.

11. In a toggle bolt, the combination of two pivoted wing anchors, each being of sufficient length to straddle or bridge the inner end of a hole in a wall or other support to which they are mounted, said anchors being pivoted at such a point that they will each bridge or straddle the inner end of the hole, to insure a strong bond or grip and to distribute the strains and stresses over a relatively large area of the inner surface of the wall or other support, and means to clamp the wing anchors against the inner surface of said wall or other support.

12. In a spring toggle bolt, the combination of a nut provided with pivoting means to support two wing anchors, and two wing anchors pivoted on said nut at such a point that they will each straddle and bridge the inner end of a hole in a support in which they are to be mounted, and means to clamp the wing anchors against the inner surface of the support.

13. In a spring toggle bolt, the combination of a nut provided with pivoting means to support wing anchors, a plurality of wing anchors mounted on said nut, each wing anchor being of greater length than the diameter of the hole in a support in which it is to be mounted, said wing anchors being pivoted at such a point that each wing anchor will straddle or bridge the inner end of said hole and distribute the strains and stresses at a multiplicity of points on the inner surface of said support, and means to operate the toggle bolt.

14. In a spring toggle bolt, the combination of a nut provided with pivoting means to support wing anchors, and pivoted wing anchors pivoted on the nut at such a point that each wing anchor will straddle or bridge the inner end of a hole in which they are to be mounted, a bolt, resilient means to cause the wing anchors to swing on the pivoting means, and stops carried by the wing anchors, adapted to contact with the bolt, to limit the swing of the wing anchors.

15. In a toggle bolt the combination of two cooperating identical wing anchors, thereby avoiding rights and lefts each wing anchor being of greater length than the diameter of a hole in which it is to be mounted, and means to pivot said wing anchors at such a point that each of said anchors will bridge or straddle the inner end of said hole to insure a strong bond or grip, and to distribute the strains and stresses over a relatively large area of the inner surface of the wall or support adjacent said hole.

HENRY W. PLEISTER.